TIMING DIAGRAM

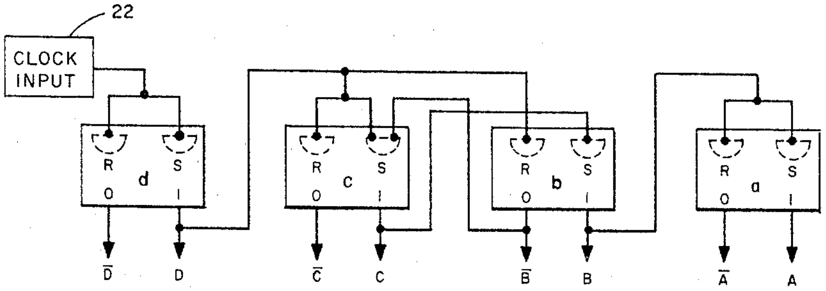
FIG. 1
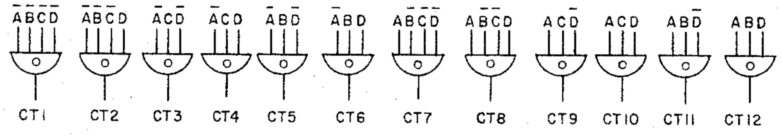
FIG. 2
| STATE | a b c d | BINARY EQUIV. | OUTPUT |
|---|---|---|---|
| 1 | 0 0 0 0 | 0 | $\bar{A}\bar{B}\bar{C}\bar{D}$ |
| 2 | 0 0 0 1 | 1 | $\bar{A}\bar{B}\bar{C}D$ |
| 3 | 0 0 1 0 | 2 | $\bar{A}C\bar{D}$ |
| 4 | 0 0 1 1 | 3 | $\bar{A}CD$ |
| 5 | 0 1 0 0 | 4 | $\bar{A}B\bar{D}$ |
| 6 | 0 1 0 1 | 5 | $\bar{A}BD$ |
| 7 | 1 0 0 0 | 8 | $A\bar{B}\bar{C}\bar{D}$ |
| 8 | 1 0 0 1 | 9 | $A\bar{B}\bar{C}D$ |
| 9 | 1 0 1 0 | 10 | $AC\bar{D}$ |
| 10 | 1 0 1 1 | 11 | $ACD$ |
| 11 | 1 1 0 0 | 12 | $AB\bar{D}$ |
| 12 | 1 1 0 1 | 13 | $ABD$ |
TABLE OF STATES
FIG. 3
David L. Jones,
*INVENTOR.*
Harry M. Saragovitz
BY Edward J. Kelly
Herbert Berl
Robert C. Sims

David L. Jones,
*INVENTOR.*
BY Harry M. Saragovitz
Edward J. Kelly
Herbert Berl
Robert C. Sims 3,274,498
TWELVE-STATE TIMING PULSE GENERATOR USING TRAILING-EDGE TRIGGERING

David L. Jones, Kensington, Md., assignor, by mesne assignments, to the United States of America as represented by the Secretary of the Army Filed Feb. 26, 1964, Ser. No. 347,635
9 Claims. (Cl. 328—42)

This invention relates generally to a timing pulse generator and more particularly to a timing pulse generator capable of counting through twelve states for control timing in a buffering unit between a radar system and a magnetic tape unit.

Ordinary conventional counters having flip-flop circuits which are used for counting require in their construction external input gates. This type counter also makes additional circuitry and gates necessary. They further require input gates to set and reset each flip-flop and require each flip-flop to be clocked. To use other than a straight binary mode of counting to get the 12 states, necessitates more than just an additional design effort.

It is therefore, an object of the present invention to provide a pulse generator suitable for use in a buffering unit between radar and magnetic tape.

A further object of the present invention is to provide a reduction in the number of component parts used in such a pulse generator.

A still further object of this invention is to provide a counter of N flip-flops which will count through less than $2^N$ states and then repeat the pattern (where N represents the number of flip-flops used).

These and other objects and advantages of the present invention will become apparent from the following detailed description and from the accompanying drawings in which:

FIGURE 1 is a schematic circuit diagram according to the invention.

FIGURE 2 is a diagrammatic showing of the output gates of the invention,

FIGURE 3 is a table of the states, and

Figure 4:
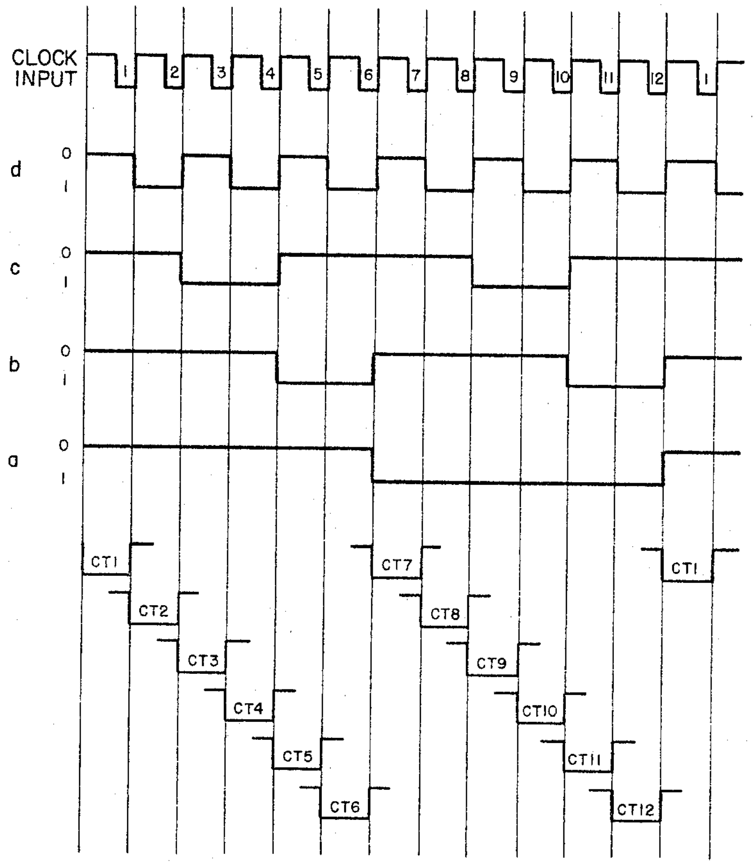
FIGURE 4 is a timing diagram in which the abscissa is time and the ordinate is voltage.

In FIGURE 1 reference numerals *a*, *b*, *c*, and *d* represent transistor modules of the flip-flop type. These modules may be Westinghouse G–40 Transistor Modules which are described in Westinghouse Electronics Division Advanced Development Report No. 108.11, July 1959. A train of clock pulses 9 microseconds apart, shown in the timing diagram of FIGURE 4, are applied by clock input 22 to both set input S and reset input R of flip-flop *d*. An output D of flip-flop *d* is connected to reset inputs of both flip-flop *c* and *b*, and is also connected to set input S of flip-flop *c*. An output C of flip-flop *c* is connected to set input S of flip-flop *b*. Flip-flop *b* has an output $\overline{B}$ which is connected back to set input S of flip-flop C, and an output B which is connected to both the set and reset inputs of flip-flop *a*.

The set input of flip-flop *c* constitutes an AND gate. Therefore flip-flop *c* will not turn on unless there is a voltage output from $\overline{B}$.

FIGURE 2 shows output gates of the invention. The reference numerals above the output gates CT1–CT12 indicate the connections to the outputs of the flip-flops *a–d* of FIGURE 1. All of the output gates are AND gates. Of the twelve states, eight of the output gates require only three inputs each and the remaining four require four inputs each. No input gates are needed beyond the gating already provided in the flip-flop modules, since trailing-edge triggering is used between stages.

FIGURE 3 shows a table of the states and their binary equivalent. The output of module *a* is 8, that of module *b* is 4, module *c* is 2, and the output of module *d* is 1.

The operation of the counter is as follows (see timing diagram of FIGURE 4): beginning with all flip-flops in the off or zero state (defined as −8 volts at the "0," barred, or reset output; and as 0 volts at the "1" or set output) the trailing or positive-going edge of the first input clock pulse turns on flip-flop *d*. The next clock pulse (hereinafter indicated by CP) again causes *d* to change state, this time going off. As flip-flop *d* turns off, the output from its 1 or D side, going positive (i.e., from −8 volts to 0 volts) causes flip-flop *c* to change state. Note that in order to do this, flip-flop *b* must be off, as an output from its 0 or $\overline{B}$ side must be present to enable the self-contained AND gate in the set side of flip-flop *c*. The third clock pulse (CP3) turns flip-flop *d* on again and CP4 turns *d* off, again causing *c* to change state, which in this case means going off. As *c* turns off, the resulting positive-going edge of its output turns on flip-flop *b*. Note that this is simply a set input, not a turnover input. CP5 turns *d* on, and CP6 turns *d* off. The positive-going edge of *d*'s output D would normally cause *c* to change state but since *b* is now on, this signal cannot go through the AND gate in the set input of *c*; therefore *c* will remain off. However, *b* is turned off directly, since *d*'s output D goes to *b*'s reset input. The positive-going edge of *b*'s output B, in turn, turns flip-flop *a* on. At this point flip-flops *b*, *c*, and *d* are all off, and the entire cycle just described is now repeated with *a* in the on state, until *b* has again cycled on and off, turning *a* off to begin the next cycle of 12 counts.

The bottom half of FIGURE 4 shows the on times of the output gates CT1–CT12 relative to the flip-flops *a–d*. For example, there is an output from CT8 when flip-flop *a* is on; flip-flop *b* is off; flip-flop *c* is off; and flip-flop *d* is on. Or in other words when there is a voltage on the outputs A, $\overline{B}$, $\overline{C}$, and D. This is clearly shown, also, in FIGURES 2 and 3.

This invention fills the requirement of a timing pulse generator capable of counting through 12 states, to provide up to 12 timing signals at intervals of 9 microseconds for control timing in a buffering unit between radar and magnetic tape. The input to the timing generator is a train of clock pulses 9 microseconds apart.

While the invention has been described with reference to a preferred embodiment thereof, it will be apparent that various modifications and other embodiments thereof will occur to those skilled in the art within the scope of the invention. Accordingly, I desire the scope of my invention to be limited only by the appended claims.

I claim:

1. A timing pulse generator comprising in combination first, second, third and fourth flip-flop means each having a set input and a reset input; a logic AND gate means operatively coupled to the set input of said second flip-flop means; a source of clock input pulses connected directly to the set and the reset inputs of said first flip-flop means; connections from an output of said first flip-flop means to the reset input of said second flip-flop means, to a first input of said AND gate means, and to the reset input of said third flip-flop means; connections from an output of the second flip-flop means to the set input of said third flip-flop means; connections from one output of the third flip-flop means to a second input of said AND gate means; and connections from another output of said third flip-flop means to the set and reset inputs of said fourth flip-flop means.

2. A timing pulse generator as set forth in claim 1, wherein said flip-flop means are of the type which are triggered by a trailing edge of a negative pulse.

3. A timing pulse generator comprising in combination first, second, third and fourth flip-flops, each having a set input, a reset input, a set output and a reset output; a logic AND gate means operatively coupled to the set input of said second flip-flop; a source of clock input pulses connected to both the set input and the reset input of said first flip-flop; a connection from the set output of the first flip-flop to the reset inputs of both the second and third flip-flops and to a first input of said AND gate means; a connection from the set output of said second flip-flop to the set input of said third flip-flop; a connection from the reset output of said third flip-flop to a second input of said AND gate means; and a connection from the set output of said third flip-flop to both the set and reset inputs of said fourth flip-flop.

4. A timing pulse generator as set forth in claim 3, wherein said flip-flops of the type which are triggered by a trailing edge of a negative pulse.

5. A timing pulse generator as set forth in claim 3, wherein said set outputs of each of the flip-flops provides a "one" output when the flip-flops are triggered on, and each of the reset outputs provide a "zero" output when the flip-flops are triggered on.

6. A timing pulse generator as set forth in claim 3, further comprising a plurality of AND gates each having input connections from one output of each of at least three of said flip-flops; and each AND gate having a different combination of connections such that only one AND gate at a time will have an output.

7. A timing pulse generator as set forth in claim 6, wherein said plurality of AND gates are twelve in number; eight of the gates having only three input connections each; and the remaining four having only four input connections each.

8. A timing pulse generator as set forth in claim 5, wherein said logic AND gate means is a self-contained AND gate in the set side of said second flip-flop.

9. A timing pulse generator as set forth in claim 8, wherein said flip-flops are of the type which are triggered by a trailing edge of a negative pulse.

References Cited by the Examiner

UNITED STATES PATENTS

| | | | |
|---|---|---|---|
| 2,853,238 | 9/1958 | Johnson | 328—42 X |
| 3,064,890 | 11/1962 | Butler | 328—42 X |

ARTHUR GAUSS, *Primary Examiner.*

J. S. HEYMAN, *Assistant Examiner.*